US010635116B2

(12) United States Patent
Herman (10) Patent No.: US 10,635,116 B2
(45) Date of Patent: Apr. 28, 2020

(54) VIDEO CALIBRATION WITH ILLUMINATION INVARIANT IMAGE (71) Applicant: Ford Global Technologies, LLC, Dearborn, MI (US)

(72) Inventor: David Michael Herman, Southfield, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 239 days.

(21) Appl. No.: 15/788,121

(22) Filed: Oct. 19, 2017

(65) Prior Publication Data
US 2019/0124232 A1    Apr. 25, 2019

(51) Int. Cl.
G04D 1/02 (2006.01)
H04N 1/60 (2006.01)
G06T 7/90 (2017.01)
G05D 1/02 (2020.01)

(52) U.S. Cl.
CPC ............. G05D 1/0246 (2013.01); G06T 7/90 (2017.01); H04N 1/6033 (2013.01); G05D 2201/0213 (2013.01)

(58) Field of Classification Search
None
See application file for complete search history.

(56) References Cited

U.S. PATENT DOCUMENTS

| 7,171,023 | B2 | 1/2007 | Kim et al. |
| 7,751,639 | B1 | 7/2010 | Finlayson et al. |
| 9,218,534 | B1 | 12/2015 | Smith |
| 2003/0160877 | A1* | 8/2003 | Sumida ............... H04N 17/002 348/223.1 |
| 2012/0008019 | A1* | 1/2012 | Zhang ................ G06K 9/00791 348/251 |
| 2012/0008020 | A1* | 1/2012 | Zhang ................ G06K 9/00791 348/251 |
| 2013/0342694 | A1* | 12/2013 | Friedhoff ........... G06K 9/00791 348/148 |
| 2015/0154459 | A1* | 6/2015 | Park ................... G06K 9/00798 382/104 |
| 2016/0209846 | A1 | 7/2016 | Eustice et al. |

(Continued)

FOREIGN PATENT DOCUMENTS

CN    102607592 B    11/2014

OTHER PUBLICATIONS

Álvarez et al., article entitled "Road Detection Based on Illuminant Invariance," IEEE Transactions on Intelligent Transportation Systems, 1524-9050/$26.00 © 2010 IEEE.

(Continued)

Primary Examiner — Justin P. Misleh
(74) Attorney, Agent, or Firm — Frank A. MacKenzie; Bejin Bieneman PLC (57) ABSTRACT A system, including a processor in a vehicle and a memory, the memory including instructions to be executed by the processor to acquire a color image wherein a portion of the color image includes a color calibration pattern and operate the vehicle based on determining an illumination invariant image based on the color image and transform parameters $\alpha_y$ and $\alpha_r$ based on the color calibration pattern.

20 Claims, 6 Drawing Sheets

(56) References Cited

U.S. PATENT DOCUMENTS

| | | | |
|---|---|---|---|
| 2017/0023945 A1 | 1/2017 | Cavalcanti et al. | |
| 2017/0076455 A1* | 3/2017 | Newman | G06T 7/74 |
| 2017/0142309 A1* | 5/2017 | Hayashi | H04N 5/23203 |
| 2018/0181793 A1* | 6/2018 | Ariga | H04N 1/6033 |
| 2019/0147622 A1* | 5/2019 | Li | G01C 11/08 |
| | | | 382/154 |

OTHER PUBLICATIONS

Maddern et al., article entitled "LAPS-II: 6-DoF Day and Night Visual Localisation with Prior 3D Structure for Autonomous Road Vehicles," University of Oxford, UK, {wm,alexs,pnewman}@robots.ox.ac.uk.

Maddern et al., article entitled "Illumination Invariant Imaging: Applications in Robust Vision-based Localisation, Mapping and Classification for Autonomous Vehicles," University of Oxford, UK, {wm,alexs,pnewman}@robots.ox.ac.uk, Queensland University of Technology, Australia, ben.uperoft@gut.edu.au.

Paton et al., article entitled "It's Not Easy Seeing Green: Lighting-Resistant Stereo Visual Teach & Repeat Using Color-Constant Images," 2015 IEEE International Conference on Robotics and Automation (ICRA) Washington State Convention CenterSeattle, Washington, May 26-30, 2015, 978-1-4799-6922-7/15/$1.00 © 2015 IEEE.

Pohlen et al., article entitled "Full-Resolution Residual Networks for Semantic Segmentation in Street Scenes," Visual Computing InstituteRWTH Aachen University, tobias.pohlen@rwth-aachen.de, {hermans, mathias, leibe}@vision.rwth-aachen.de, arXiv:1611.08323v2 [cs.CV] Dec. 6, 2016.

Sridharan et al., article entitled "Color learning and illumination invariance on mobile robots: a survey—ScienceDirect," Robotics and Autonomous Systems, vol. 57, Issues 6-7, Jun. 30, 2009, pp. 629-644, http://www.sciencedirect.com/science/article/pii/S0921889009000207.

* cited by examiner

VIDEO CALIBRATION WITH ILLUMINATION INVARIANT IMAGE

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and accurate operation of the vehicle can depend upon acquiring accurate and timely information regarding the vehicle's environment. Computing devices, networks, sensors and controllers can be equipped to analyze their performance, detect when information is not being acquired in an accurate and timely fashion, and take corrective actions including informing an occupant of the vehicle, relinquishing autonomous control or parking the vehicle. However, it is a problem to ensure that received sensor data is accurate and reliable for vehicle operation. For example, image sensors can acquire image data, but if a vehicle computer cannot accurately determine a color or colors represented in the image, the vehicle computer's ability to safely and efficiently operate one or more vehicle components and/or to operate the vehicle in a fully autonomous mode will be impaired.

DETAILED DESCRIPTION

Vehicles can be equipped to operate in both autonomous and occupant operated mode. By a semi- or fully-autonomous mode, we mean a mode of operation wherein a vehicle can be operated by a computing device as part of a vehicle information system having sensors and controllers. The vehicle can be occupied or unoccupied, but in either case the vehicle can be operated without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

Disclosed is a method in a vehicle, including acquiring a color image having a portion that includes a color calibration pattern, and actuating navigation of the vehicle based on determining an illumination invariant image based on transform parameters $\alpha_v$ and $\alpha_r$ and a color-corrected color image based on the color calibration pattern. The color-corrected color image can be based on the color calibration pattern includes using values in the color calibration pattern in a series linear equations that are solved to form transform parameters to color-correct the color image. Determining an illumination invariant image based on transform parameters $\alpha_v$ and $\alpha_r$ can be performed separately depending upon a segmentation classification. Solving the series of linear equations for transform parameters to color correct the color image can be performed to obtain the same red-green-blue values as a color image acquired in full sunlight at zenith. The color calibration pattern can include a plurality of colors at a plurality of intensities.

The plurality of colors can include one or more groups of colors that span a color space that includes visible and non-visible spectrum colors including NIR. The groups of colors that span the color space includes red, green and blue. Determining whether to transform an RGB pixel of the color image with transform parameter $\alpha_v$ or transform parameter $\alpha_r$ can depend upon whether the RGB pixel is classified as "vegetation" or "non-vegetation". The RGB pixel can be classified as "vegetation" or "non-vegetation" based on segmenting the color image by a trained convolutional neural network. The RGB pixel can be classified as "vegetation" or "non-vegetation" based on the color-corrected color image. The convolutional neural network can be trained by back-propagation. The back-propagation can be based on manually classified color images. Actuating navigation can include determining a path for the vehicle based on the illumination invariant image. Actuating navigation can include determining commands to controllers to control vehicle brakes, steering and powertrain to operate vehicle on the path.

Further disclosed is a computer readable medium, storing program instructions for executing some or all of the above method steps. Further disclosed is a computer programmed for executing some or all of the above method steps, including a computer apparatus, programmed to acquire a color image having a portion that includes a color calibration pattern, and actuate navigation of the vehicle based on determining an illumination invariant image based on transform parameters $\alpha_v$ and $\alpha_r$ and a color-corrected color image based on the color calibration pattern. The color-corrected color image can be based on the color calibration pattern includes using values in the color calibration pattern in a series linear equations that are solved to form transform parameters to color-correct the color image. The computer can be further programmed to determine an illumination invariant image based on transform parameters $\alpha_v$ and $\alpha_r$ can be performed separately depending upon a segmentation classification. The computer can be further programmed to solve the series of linear equations for transform parameters to color correct the color image can be performed to obtain the same red-green-blue values as a color image acquired in full sunlight at zenith. The color calibration pattern can include a plurality of colors at a plurality of intensities.

The plurality of colors can include one or more groups of colors that span a color space that includes visible and non-visible spectrum colors including NIR. The groups of colors that span the color space includes red, green and blue. The computer can be further programmed to determine whether to transform an RGB pixel of the color image with transform parameter $\alpha_v$ or transform parameter $\alpha_r$ can depend upon whether the RGB pixel is classified as "vegetation" or "non-vegetation". The RGB pixel can be classified as "vegetation" or "non-vegetation" based on segmenting the color image by a trained convolutional neural network. The RGB pixel can be classified as "vegetation" or "non-vegetation" based on the color-corrected color image. The convolutional neural network can be trained by back-propagation. The back-propagation can be based on manually classified color images. Actuating navigation can include determining a path for the vehicle based on the illumination invariant image. Actuating navigation can include determining commands to controllers to control vehicle brakes, steering and powertrain to operate vehicle on the path.

Figure 1:
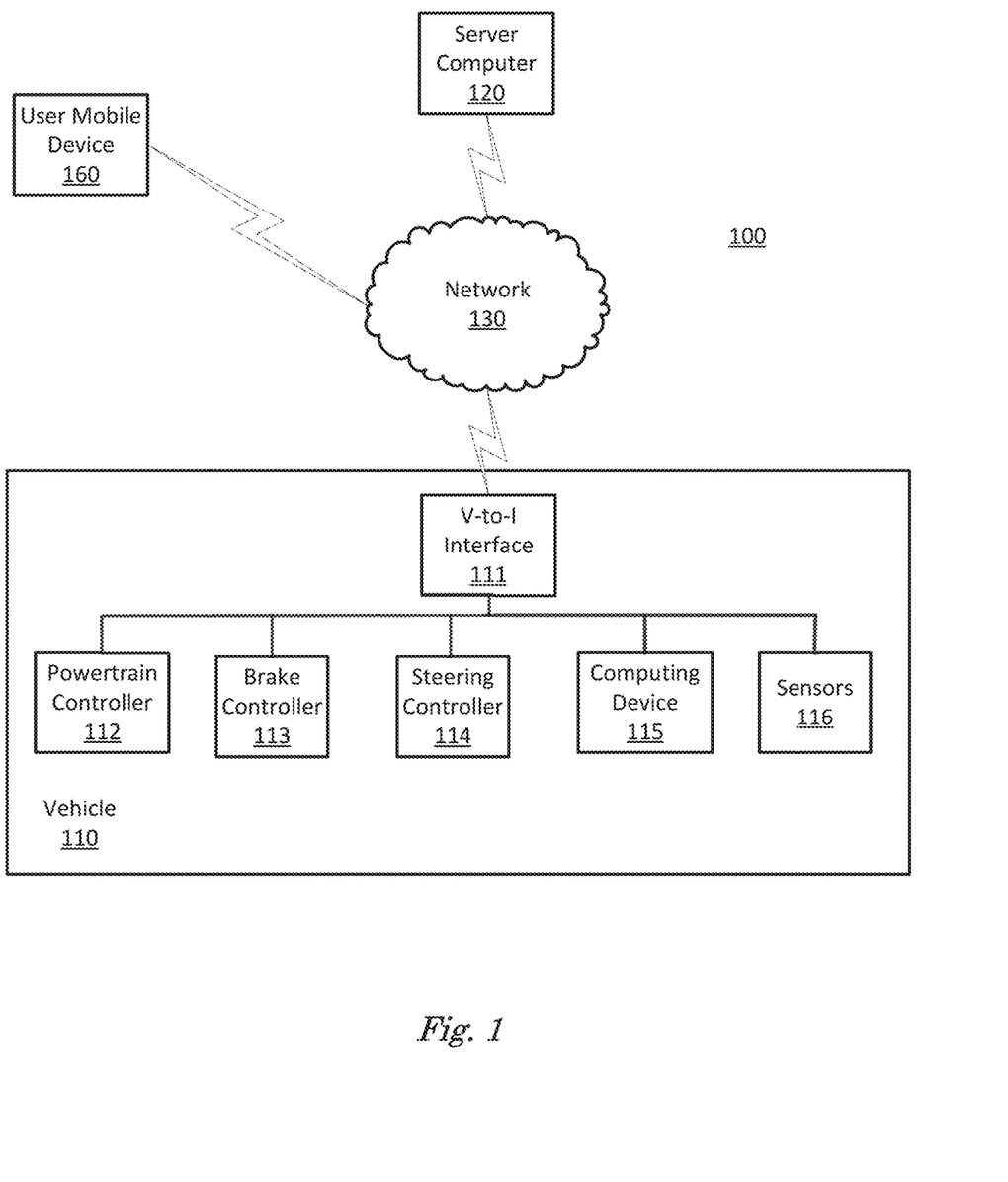
FIG. 1 is a block diagram of an example vehicle.

FIG. 1 is a diagram of a vehicle information system 100 that includes a vehicle 110 operable in autonomous ("autonomous" by itself in this disclosure means "fully autonomous") and occupant operated (also referred to as non-autonomous) mode. Vehicle 110 also includes one or more computing devices 115 for executing program instructions for operating the vehicle 110 during autonomous and semi-autonomous operation and/or for providing information, e.g., for display to an occupant, during any mode of operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, internal combustion/electric hybrid powertrain, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications network such as a communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus and/or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
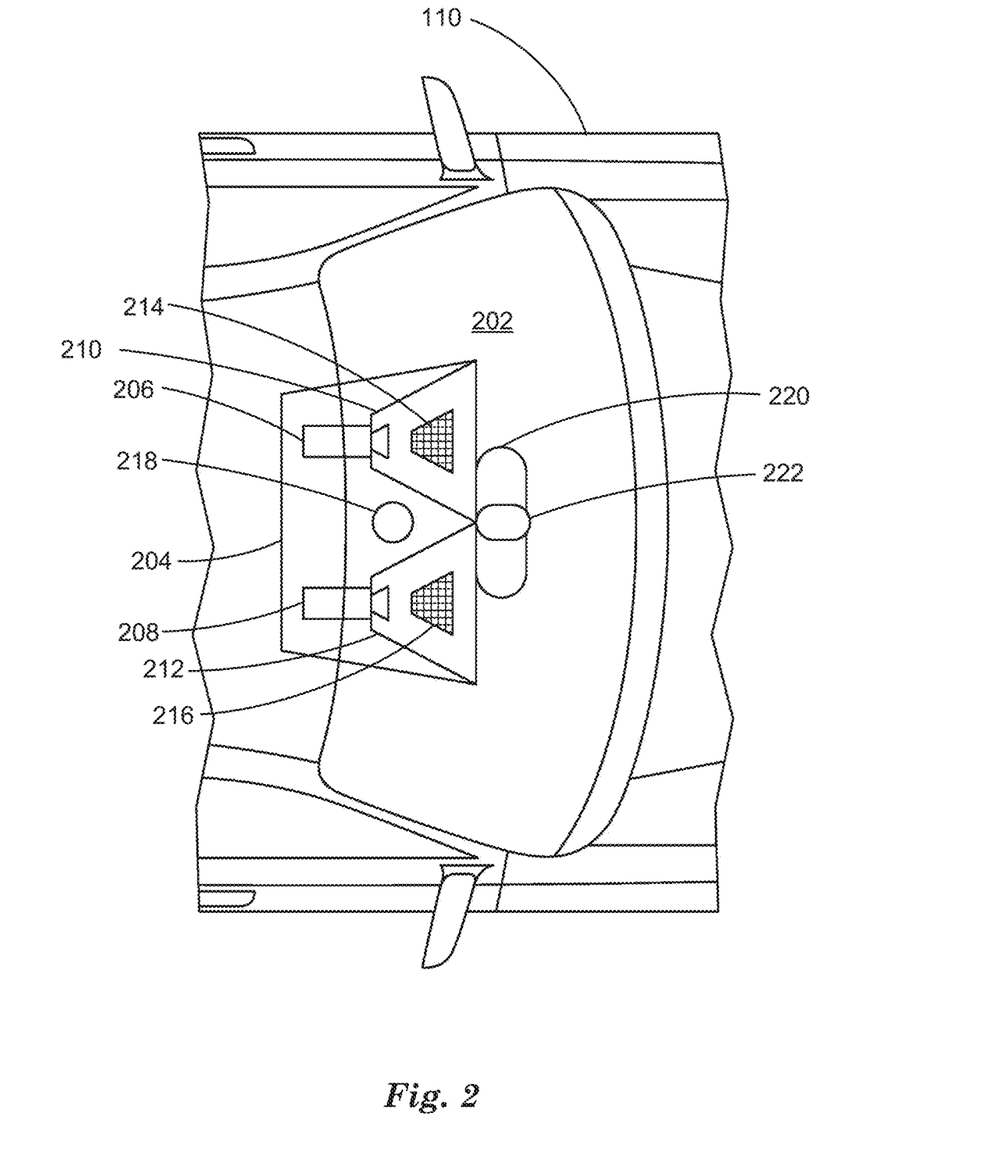
FIG. 2 is a diagram of an example portion of a vehicle with a sensor housing having two video cameras.

FIG. 2 is a diagram of a portion of a vehicle 110 in an x-ray (i.e., cut-away) view including a windshield 202. Attached to windshield 202 is a sensor housing 204. Sensor housing 204 can attach to an inner surface of windshield 202 and in this example, includes two video cameras 206, 208. Sensor housing 204 can also include one video camera 206, a radar sensor 116 or a LIDAR sensor 116, for example. Video cameras 206, 208 can be mounted to view forward through windshield 202 via relief areas 210, 212 molded into sensor housing 204. In this example sensor housing 204 is located at an upper, central portion of windshield 202 and provides video cameras 206, 208 with forward-looking fields of view without obstructing the view of possible vehicle 110 occupants. In other examples the sensor housing 204 can provide sensors 116 with a backward-looking, or side-looking fields of view by mounting the sensor housing 204 in different orientations at different locations within and upon vehicle 110. Sensor housing 204 can be incorporated into a glass or transparent plastic portion of vehicle 110 such as windows or headlamp assemblies or built into transparent portions of side pillars, side-view mirrors or other portions of vehicle 110 made transparent for that purpose.

In many examples, sensor housing 204 can include a transparent glass or plastic cover that protects sensors 116 from the environment and that can be cleaned to provide a clear field of view. Sensor housing 204 can be configured with or without relief areas 210, 212, for example. In examples where sensor housing 204 includes relief areas 210, 212, color calibration patterns 214, 216 can be applied to the relief areas 210, 212. A relief area 210, 212 is portion of a sensor housing 204 that is free of non-transparent material to give a sensor such as a video camera 206, 208 mounted inside the sensor housing 204 at least a partially clear field of view of a scene external to vehicle 110. Video cameras 206, 208 can be configured to have fields of view that include portions of both the external scene and relief areas 210, 212. Relief areas 210, 212 can have color calibration patterns 214, 216 applied to the surface of relief areas 210, 212 so as to be visible in a central lower portion of the fields of view of video cameras 206, 208, respectively.

In examples where sensor housing 204 does not include relief areas 210, 212, or insufficient portions of the relief areas 210, 212 are present in the field of view of video cameras 206, 208, color calibration patterns 214, 216 can be applied to the inside surface of the transparent cover. The backside of the color calibration pattern 214, 216 can be made opaque to block a view of the pattern from the outside. The backside can be made black, for example, or any other color to blend in with vehicle 110 body panels or tinted glass or plastic. Color calibration patterns 214, 216 can occur anywhere in the field of view of video cameras 206, 208. For example, color calibration patterns 214, 216 can be applied to an inner surface of windshield 202 within the field of view of video cameras 206, 208.

Figure 5:
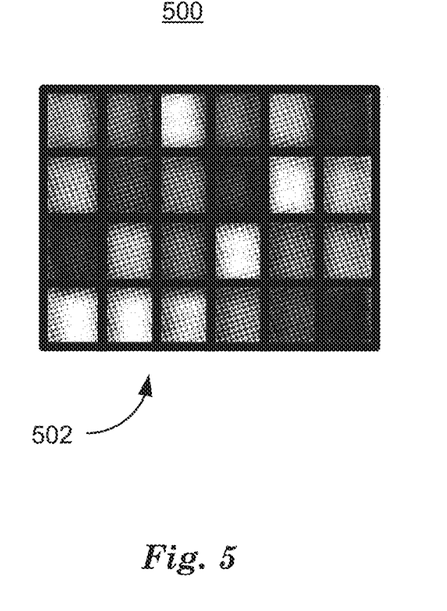
FIG. 5 is a diagram of an example color target.

Knowledge of how and where color calibration patterns 214, 216 are positioned with respect to the field of view, i.e. location and pose, along with focal distance of the lens, permits the color calibration patterns 214 to be distorted based on the geometric transforms produced by video cameras 206, 208 to provide a desired shape and size in the output video image data. For example, color calibration patterns 214, 216 can be distorted to form trapezoids, as shown. When applied to relief areas 210, 212, and imaged by video cameras 206, 208, the color calibration patterns appear rectangular, as shown in FIG. 5. Using knowledge of the geometric transformation that shapes undergo based on their location and pose in the field of view permits color calibration pattern 214, 216 to be shaped to form characters, words, or product logos that, when imaged by video cameras 206, 208, are legible when viewed in video data by an occupant.

Also included in sensor housing 204 is a rain/sunlight sensor assembly 218 mounted to view upwards through windshield 202. Rain/sunlight sensor assembly 218 can include photosensitive electronic components that measure the spectral intensity of ambient light and measure the reflectance of emitted infrared light to determine an amount of rain on the windshield 202, for example. A rear-view mirror 220 can be attached to sensor housing 204 by rear-view mirror pylon 222. This example shows two color calibration patterns 214, 216 and two color video cameras 206, 208, however, techniques discussed herein can employ one video camera 206 or more than two video cameras 206, 208.

Figure 3:
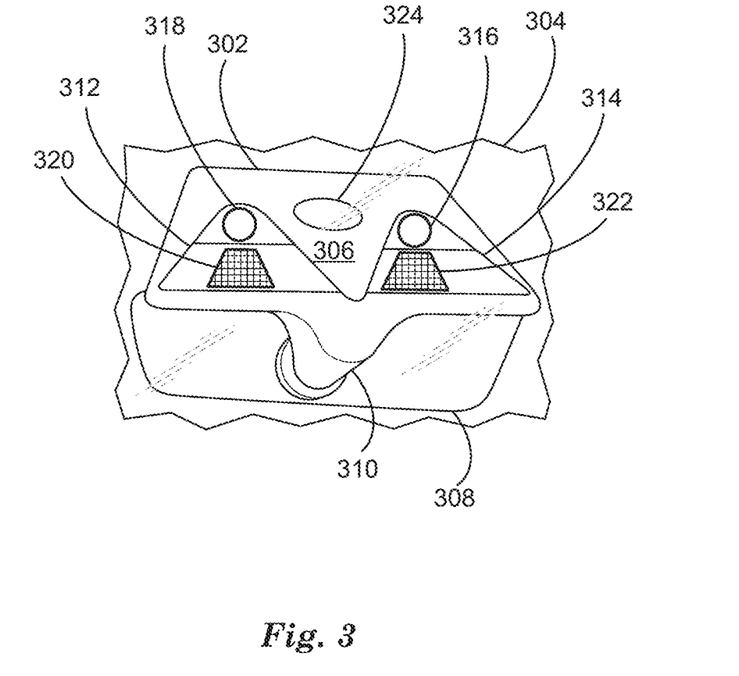
FIG. 3 is a diagram of an example sensor housing with two video cameras.

FIG. 3 is diagram of a sensor housing 304 attached to an inner surface of a windshield 302 by an adhesive 306. As discussed above in relation to FIG. 2, sensor housing 304 can be incorporated into other portions of vehicle 110 such as side pillars, side-view mirror housing, headlamp assembly, for example. Sensor housing 304 can be attached to rear-view mirror 308 via rear-view mirror pylon 310. Sensor housing 304 includes two relief areas 312, 314 that permit video cameras 316, 318 to view in a forward direction through windshield 302. Included in relief areas 312, 314 are color calibration patterns 320, 322 visible in a central, lower portion of fields of view of video cameras 316, 314. Also included in sensor housing 304 is a rain/sunlight sensor assembly 324 mounted to view upwards through windshield 302.

Figure 4:
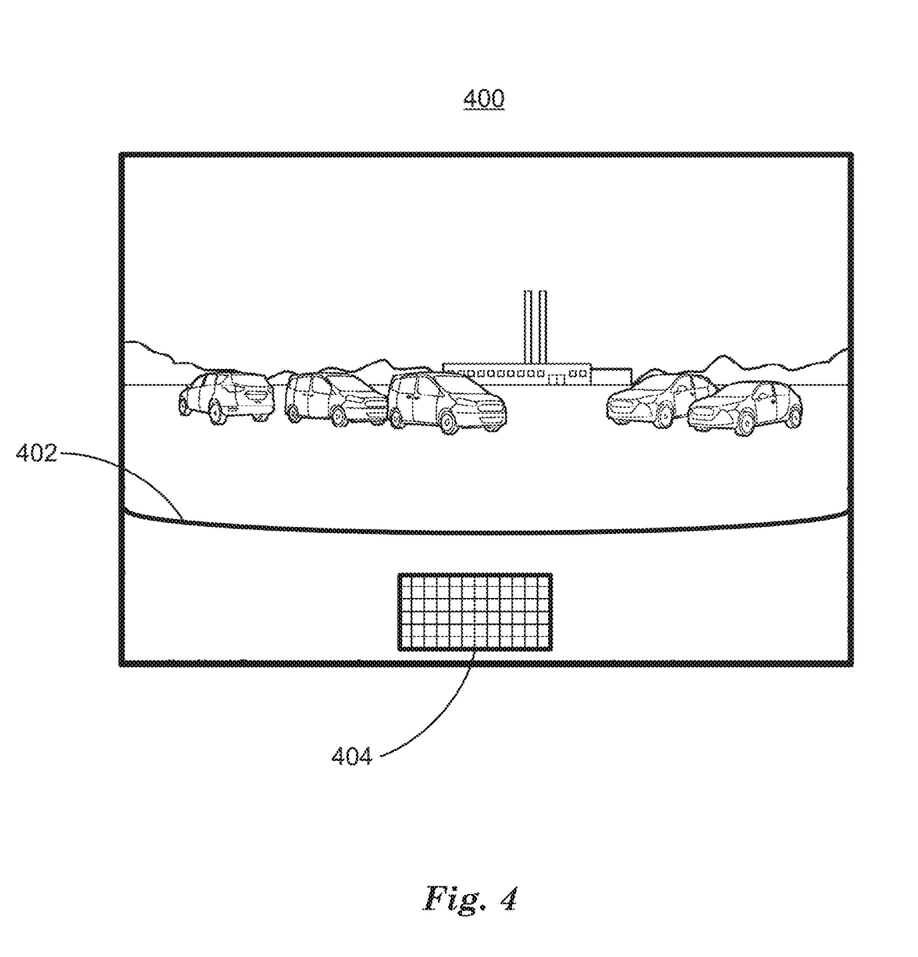
FIG. 4 is a diagram of an example video image.

FIG. 4 is a diagram of a color video image 400 rendered as a black and white line drawing, acquired by a video camera 206, 208, 316, 314 in a sensor housing 204, 304. Visible in the lower portion of color video image 400 is a relief area 402 and in central, lower portion of relief area 402 an image of a color calibration pattern 404. Note that the image of the color calibration pattern 404 appears rectangular in color video image 400. The image of color calibration pattern 404 appears rectangular since the color calibration patterns 214, 216, 312, 314 are shaped as trapezoids to compensate for the foreshortening caused by the video camera lens projecting the color calibration pattern 214, 216, 320, 322 onto the color image sensor in video camera 316, 314 to create the image of the color calibration pattern 404. In the same fashion, alphanumeric characters or images including vehicle manufacturers logos can be included in the color calibration pattern 214, 216, 320, 322 and be legible in color video image 400, for example.

FIG. 5 is a diagram of an example color calibration pattern 500 rendered in halftone greyscale. Color calibration pattern 500 is a halftone rendering of a greyscale representation (because patent drawings are limited to black-and-white) of a 4×6 array of color tiles 502, each one of which is colored in a sample color of one of a plurality of colors that sample the range of hues and saturations of colors visible to humans and color video cameras. Near infrared (NIR) video cameras that image near infrared frequencies of light not usually visible to humans can be used in addition to color video cameras to increase the range of colors available for calibration. For example, color tiles 502 can include tiles primary colors that represent two separate encodings (red-green-blue, and yellow-cyan-magenta) that span the range of colors visible to humans. Color tiles 502 can also include tiles that represent secondary colors or combinations of the primary colors such as orange, blue-green, and purple, and various saturations of the primary and secondary colors such as light green, light orange, light blue, pink, brown, and lilac, and greyscale shades including white, greys and black. Spanning a color space refers to the ability to represent any color in the color space by combining the colors in the color space in the proper proportion. Both red-green-blue and yellow-cyan-magenta have this property.

Computing device 115 can acquire a color video image that includes color calibration pattern 500 and process color calibration pattern 500 to determine transform parameters that can transform input color video data into first a color corrected video data and then into a monochrome illumination invariant video data for input to actuate navigation for vehicle 110. The color corrected video data can also be re-processed by a color video segmentation process to re-segment the color video data. Re-segmenting color video data with color corrected video data can be more accurate than segmenting un-corrected color video data, for example. The color corrected video data can also be input to other navigation tasks performed by computing device 115. For example, recognizing stop signs according to the color can be more accurate using color corrected video data.

Actuating navigation for vehicle 110 means providing illumination invariant video data or color corrected video data to processes executing on computing device 115 that permit computing device 115 to determine commands to be sent to controllers 112, 113, 114 to control vehicle 110 steering, braking and powertrain that control the motion of vehicle 110 in a safe and comfortable fashion to reach a goal. Navigation includes controlling the motion of a vehicle 110 in a safe and comfortable fashion to reach a goal includes determining other vehicles and traffic objects, such as bridges, guardrails, barriers, and signs, etc., determining a roadway and a location of vehicle 110 with respect to the roadway and other vehicles and traffic objects, and determining a path to travel on the roadway to reach a predetermined destination while avoiding other vehicles and traffic objects and maintaining lateral acceleration and longitudinal acceleration within predetermined bounds.

Computing device 115 can determine "ground truth" data regarding the illumination conditions around the vehicle. Ground truth data is data regarding illumination conditions that would be the same as data obtained by an unbiased observer determining the illumination conditions external to vehicle 110. Illumination conditions are based on light sources including solar and artificial. Determining illumination conditions around a vehicle permits determination of illumination invariant video data localized in space and time for all times of day including night. Illumination invariant video data is color video data that has been transformed with predetermined transform coefficients to produce monochrome video data wherein red-green-blue encoded color is transformed into greyscale by transforms that preserve colors but discard illumination differences including differences caused by shadows, for example.

Figure 6:
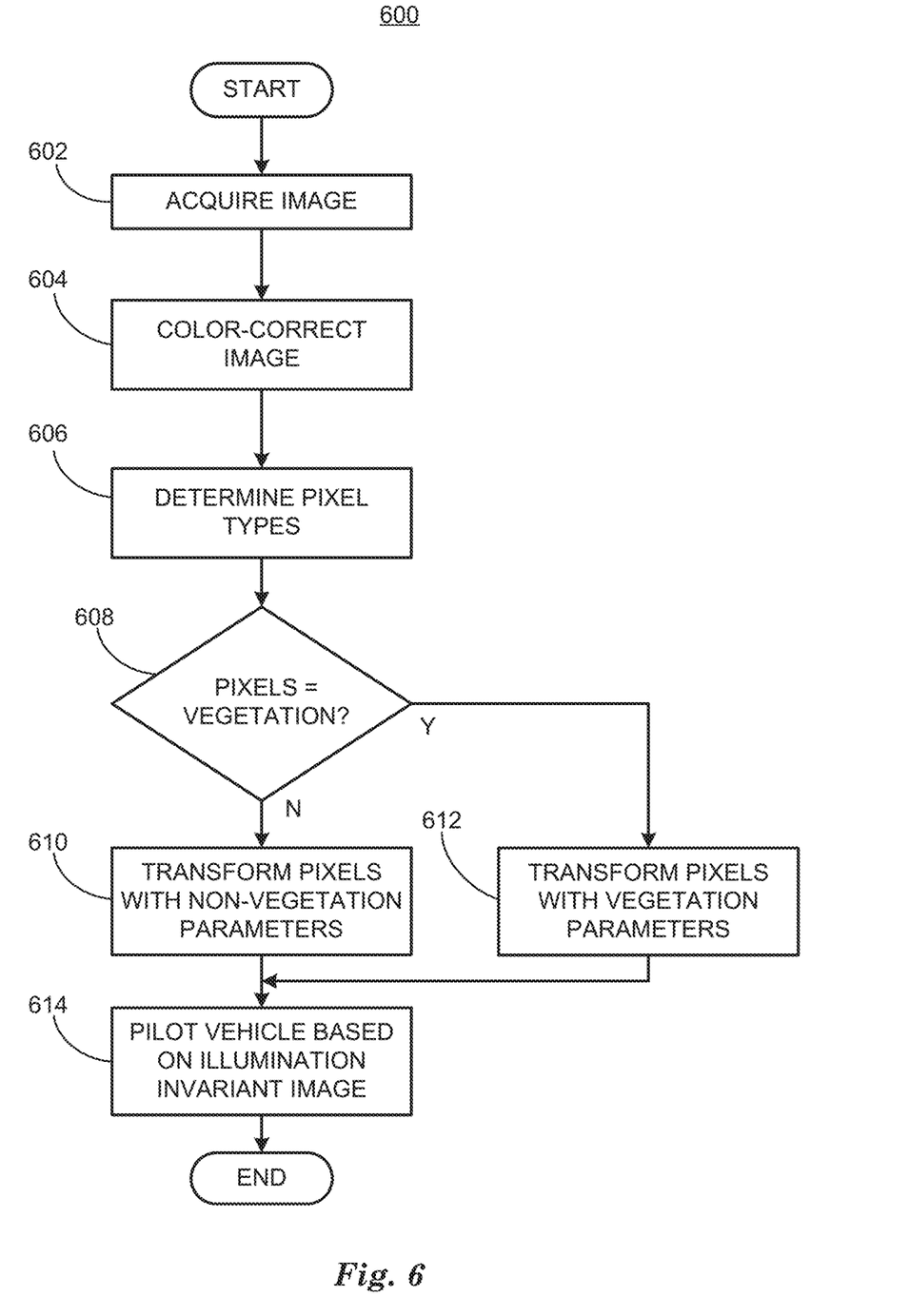
FIG. 6 is a flowchart diagram of an example process to operate a vehicle based on transformed image data.

Computing device 115 can acquire a color video image that includes a color calibration pattern 500 built into a sensor housing 204, 304 such that the color calibration pattern 500 is within the field of view of video cameras 206, 208, 316, 318 and allows computation of color correction and invariant image correction without any data about the external foreground scene. This configuration is provided for monochrome cameras to obtain data to analyze the lighting conditions. Monochrome cameras can show a non-uniform color sensitivity over the color space which can be understood with reference to the external lighting conditions. The color calibration pattern 500 can be altered to not appear as the standard assembly of colored squares but can be configured to resemble a logo, text, or other suitable arrangement of the colors needed for calibration. FIGS. 6 and 7 show other arrangements of colors that can be included in a color calibration pattern 500

Varying illumination due to time of day and locality (lighting in the area around the vehicle 110) presents challenges for visual localization, mapping, navigation, scene recognition and object classification tasks that can be required for navigating and operating autonomous vehicle 110. Robust and reliable operation regardless of weather conditions and time of day is desirable for an autonomous vehicle 110. Transforming color video images from RGB space into an illumination invariant monochrome space can address the foregoing challenges and can improve the performance of computing device 115 with respect to varying illumination when operating vehicle 110. Transform parameters used to transform a color video image from RGB space into an illumination invariant monochrome image can depend upon incident scene illumination that can vary by time of day, weather conditions and presence of artificial illumination. Acquiring an image of a color calibration pattern 500, 600, 700 can permit computing device 115 to determine transform parameters that can transform RGB video data into illumination invariant monochrome video data for input to a computing device 115 for operating a vehicle 110, for example. Operating a vehicle based on illumination invariant monochrome video data can improve the reliability of operating vehicle 110 in spite of varying illumination conditions. In addition, a color corrected color video display can be more visually appealing to an occupant.

Acquiring a color video image 400 of a scene can be described mathematically by an illumination source I, which can be sunlight, with a spectral power distribution function $E(\lambda)$, where $\lambda$ represents wavelength. The spectral power distribution function $E(\lambda)$ will vary depending upon the time of day (position of the sun in the sky or artificial light) and weather conditions. The spectral power distribution function can be modeled as black-body radiation with an unknown color temperature T, where the color temperature is the central value or maximum of the spectral power distribution, which is assumed to have a central peak. The illumination source I can be reflected by portions of the scene having unknown surface reflectivity function $S(\lambda)$ based on material properties (i.e. color) and a geometry term $a*n$ based on the angle between a vector a from a location in the scene to the illumination source I and a vector n from the location in the scene to a video camera 206, 208, 316, 318.

Light from the illumination source I can be reflected from the scene according to a surface reflectivity function $S(\lambda)$ and a geometry term a*n to become incident upon an image sensor included in a video camera 206, 208, 316, 318 to produce a response $R^{x,y}$ at a location x, y on the image sensor with spectral sensitivity $F(\lambda)$ thereby forming a color video image 400.

A color video image 400, or response $R^{x,y}$, can be represented at x, y locations within the height and width of color video image 402 as a red-green-blue (RGB) triplet of values. Each of the colors in the color calibration pattern 404 will be represented by a single RGB value, within normal tolerances, making them easy to determine and process as separate colors, for example. The RGB value associated with a color will vary depending upon the time of day and weather, as discussed above. A color video image can be color corrected by first acquiring a standard color video image 400 under ideal conditions, i.e. when the sun is at its zenith (noon) on a clear day. The RGB values obtained for each color in the color calibration pattern 500 can be stored in computing device 115 memory. When subsequent color video images 400 are acquired, computing device 115 can determine the RGB values for each color in the color calibration pattern 500 and compare them to the previously acquired values to determine transform parameters that can color correct color video images by solving simultaneous linear equations.

A series of linear equations can be formed for each of the transform parameters that express each color of the color calibration pattern in terms of their re-green-blue coefficients. Solving for the difference between ideal values measured at the sun's zenith (noon) on a clear day and measured values from the color video image 402 yields the transform parameters a, b and c that transform the colors of acquired color video image into their appearance at noon in full sun. For example, a color video image 402 V can be composed of pixels $p_{x,y}$ where $1<=x<=$width of image V and $1<=y<=$height of image V. Each pixel $p_{x,y}$ occurring in each color Ci in the color calibration pattern 410 will have a similar RGB representation, namely $(R_i, G_i, B_i)$. The pixels of each of the n colors Ci, where $1<=i<=n$, of the color calibration pattern 410 can be represented by an RGB triplet $(R_i, G_i, B_i)$. The colors Ci of an acquired color calibration pattern 410 can be transformed into the colors $S_i=(R_{Si}, G_{Si}, B_{Si})$ of a standard color calibration pattern 410, acquired at noon on a clear day, by solving the simultaneous linear equations formed by transforming each color $C_i$ of the acquired color calibration pattern 410 into the corresponding color $S_i$ from the standard color calibration pattern with parameters a, b and c according to the equations:

$$R_{Si}=a_r R_i + a_g G_i + a_b B_i \quad (1)$$

$$G_{Si}=b_r R_i + b_g G_i + b_b B_i \quad (2)$$

$$B_{Si}=c_r R_i + c_g G_i + c_b B_i \quad (3)$$

Solving for the best fit solution for $a_r, a_g, a_b, b_r, b_g, b_b, c_r, c_g,$ and $c_b$ that minimizes the distance between values calculated using equations 1, 2 and 3 based on acquired values and standard values $R_{Si}, G_{Si}, B_{Si}$, can provide solutions for $a_r, a_g, a_b, b_r, b_g, b_b, c_r, c_g,$ and $c_b$. Since each of the 3 sets of simultaneous linear equations has n equations, where n is larger than 3, the equations can be overdetermined, therefore a best fit solution can be found by forming simultaneous linear equations using equations 1, 2 and 3 for the n colors $C_i$ of the acquired color calibration pattern 410 and solving by any of the mathematical techniques for solving simultaneous linear equations including single value decomposition, for example. Using parameters $a_r, a_g, a_b, b_r, b_g, b_b, c_r, c_g,$ and $c_b$, the pixels of color video image 400 can be transformed into standard colors $S_i$. More precision in solving for best fit solutions for linear equations is to use higher order polynomials (i.e. third order) that include cross-products between colors. While additional computation is required for higher order polynomials, greater precision in color correction can be achieved.

Following color correction, a color-corrected color video image 400 can be transformed into a monochrome illumination invariant image M using the transform parameter α in the equation:

$$M=\log(R_G)-\alpha \log(R_R)+(1-\alpha)\log(R_B) \quad (4)$$

where $R_R$, $R_G$, and $R_B$ are component images formed from the RGB triplets of color-corrected color video image 400. Computing device can determine transform parameter α experimentally using a standard color calibration pattern 500 acquired as described above, and adjusting α until the most uniform results are obtained. Uniform results include mapping the colors $S_i$ of the standard color calibration pattern 500 into distinct and well-spaced values in greyscale, where the colors $S_i$ are each represented by a single value, within a predetermined tolerance, that ranges from 0 to the maximum grey value, which can be greater than 256.

It has been determined experimentally that the surface reflectivity function $S(\lambda)$ of vegetation is uniformly different enough from the surface reflectivity function $S(\lambda)$ of all other surface materials that a separate transform coefficient can more accurately transform color-corrected color video image 400 into an illumination invariant monochrome image M depending upon whether a pixel has been segmented as belonging to a "vegetation" region or if the pixel has been segmented as belonging to a "non-vegetation" region, according to the equations:

$$\text{"vegetation"}: M_v=\log(R_G)-\alpha_v \log(R_R)+(1-\alpha_v)\log(R_B) \quad (5)$$

$$\text{"non-vegetation"}: M_r=\log(R_G)-\alpha_r \log(R_R)+(1-\alpha_r)\log(R_B) \quad (6)$$

Equations 5 and 6 and hence transform parameters $\alpha_v, \alpha_r,$ can be selected on a pixel-by-pixel basis depending upon the classification of a pixel as belonging to a connected region of similar pixels determined by segmentation. Segmentation may occur after color correction for improve accuracy of segmentation. The pixels of a color video image 400 be segmented into regions by classifying the pixels into a limited number of classes including a "vegetation" ($\alpha_v$) class and a "non-vegetation" ($\alpha_r$) class, where the "vegetation" ($\alpha_r$) class can include foliage classes such as "trees", "grass" and "bushes", and the "non-vegetation" ($\alpha_r$) class can include non-foliage classes such as "roadway", "vehicle", "pedestrian", "traffic object", "buildings", "concrete", "dirt", "sand" and "rocks", for example, where a class can include adjacent pixels that can be grouped into a class based on the appearance of a pixel and its neighbors. For example, color and texture are two features of transform parameters $\alpha_v, \alpha_r$ that transform a color image into an illumination invariant monochrome image are dependent upon an illumination source with an unknown spectral power distribution $E(\lambda)$ reflected from a scene with unknown surface reflectivity function $S(\lambda)$. Transform parameters $\alpha_v, \alpha_r,$ can be determined by acquiring a color video image 400 including a color calibration pattern 404, segmenting color video image 400 after color correction and determining transform parameters $\alpha_v$, $\alpha_r$ separately for pixels classified as "vegetation" and "non-vegetation".

Transforming RGB color video images into an illumination invariant monochrome image based on classification of pixels into "vegetation" and "non-vegetation" classes can be accomplished by segmenting color video image 402 after color correction. A color video image 402 can be segmented into a limited number of classes, for example 12 classes, as discussed in the example above, that can be used by computing device 115 to operate vehicle 110. An acquired color video image 402 can be segmented into classes using machine vision techniques including deep learning artificial intelligence processes such as convolutional neural networks. Convolutional neural networks include a plurality of pooling convolutional layers that decrease in resolution at each layer to determine segments of input image data and then a plurality of unpooling layers that increase in resolution to distribute the determined segments onto high resolution output, thereby reconstructing an image at or near the original input resolution with determined segments, for example. Convolutional layers can be taught to determine desired output segments by employing feedback loops known as backpropagation that reward convolutional layers for determining and weighting convolutional kernels that output the desired output segments. Convolutional neural networks can be trained to reliably segment color video images 402 into a limited number of classes useful for operating a vehicle 110 by training the convolutional neural network with manually classified result images, for example.

An example of a convolutional neural network that can segment color video data of traffic scenes into is a full-resolution residual network (FRRN). FRRNs maintain a full resolution version of the input video data in parallel to a pooling/unpooling data stream in a convolutional neural network that includes feedback loops, that communicates with the full-resolution data stream to determine a limited number of segments in full-resolution video data. Configurations of convolutional neural networks can determine segments in input video data within natural region boundaries in color video data. Natural region boundaries include color boundaries, shape boundaries, and occlusion boundaries, for example. Boundary data can be combined with segment data at each layer of the full-resolution residual network to form high-resolution, segmented output video image, for example. This approach is useful in a variety of image understanding tasks related to vehicle 110 navigation. Inputting color-corrected color video images 400 to configurations of convolutional neural networks can improve the performance of the convolutional neural networks over using non-color-corrected color video images for image understanding tasks related to vehicle 110 navigation, for example.

A high-resolution, segmented color video image 402 can be transformed by equations 5 and 6 depending upon the segmentation using the transform parameters $\alpha_v$, $\alpha_r$ determined from a color calibration pattern 410 included in the color video image 402 into an illumination invariant monochrome image. The illumination invariant monochrome image can be input to a navigation process executing on computing device 115 to navigate vehicle 110. Illumination invariant monochrome image can be more reliable for navigation than the original color video image 402, since the illumination invariant monochrome image does not include color variations caused by illumination differences such as shadows, for example, and will emphasize regions of similar color. Segmenting an illumination invariant monochrome image and identifying objects based on gray levels can be more accurate and reliable in identifying objects such as roadways, vehicles, pedestrians, buildings, and traffic objects such as signs, barriers and railings, etc., in complex scenes than identifying objects in the original color video image based on color. An illumination invariant monochrome image can be used by computing device 115 for navigation by permitting computing device 115 to determine a safe and comfortable path upon which to navigate vehicle 110 more reliably than using a color video image for navigation.

FIG. 6 is a diagram of a flowchart, described in relation to FIGS. 1-5, of a process 600 for operating a vehicle 110 based on an illumination invariant monochrome image. Process 600 can be implemented by a processor of computing device 115, taking as input information from sensors 116, and executing instructions and sending control signals via controllers 112, 113, 114, for example. Process 600 includes multiple steps taken in the disclosed order. Process 600 also includes implementations including fewer steps or can include the steps taken in different orders.

Process 600 begins at step 602, in which a computing device 115 in a vehicle 110 acquires a color video image 400 that includes a color calibration pattern 404.

At step 604, computing device 115 color-corrects color video image 400 by determining transform parameters a, b, c by measuring RGB values of the acquired color calibration pattern 404 and using the measured values to determine transform parameters a, b, c by solving simultaneous linear equations as discussed in relation to FIG. 5, above.

At step 606, computing device 115 determines pixel types by segmenting the acquired color-corrected color video image 400 to determine whether each pixel of the acquired color-corrected color video image 400 belongs to class "vegetation" or "non-vegetation."

At step 608, computing device checks each pixel of color image 400 to determine whether the pixel belongs to class "vegetation" or "non-vegetation". If the pixel belongs to the class "vegetation" process 600 passes to step 610. If the pixel belongs to the class "non-vegetation" process 600 passes to step 612. Steps 608, 610 and 612 can be performed as a processing loop that loops over the pixels of color image 400 in raster order, for example. Raster order means processing the pixels $p_{x,y}$ of an image V as sequential rows from left to right starting from the top, for example.

At step 610, computing device 115 transforms the RGB pixels of color image 400 belonging to the "non-vegetation" class into illumination invariant monochrome pixels according to equation 6 with transform parameter $\alpha_r$ as discussed above in relation to FIG. 5.

At step 612, computing device 115 transforms the RGB pixels of color image 400 belonging to the "vegetation" class into illumination invariant monochrome pixels according to equation 5 with transform parameter $\alpha_v$ as discussed above in relation to FIG. 5.

At step 614, computing device 115 navigates vehicle 110 based on the illumination invariant monochrome image formed by transforming the color image 400. As discussed above in relation to FIG. 5, computing device 115 can perform tasks required to navigate vehicle 110 with an illumination invariant monochrome image more reliably than with a color image 400. Following step 614 the process 600 ends.

Computing devices such as those discussed herein generally each include instructions executable by one or more computing devices such as those identified above, and for carrying out blocks or steps of processes described above.

For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, Python, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

I claim:

1. A method in a vehicle, comprising:
acquiring a color image having a portion that includes a color calibration pattern;
generating, based on the color calibration pattern, a color-corrected color image that includes a plurality of pixels;
determining an illumination invariant image based on the color-corrected color image and transform parameters $\alpha_v$ and $\alpha_r$; and
actuating navigation of the vehicle based on the illumination invariant image, wherein determining the illumination invariant image includes classifying pixels of the plurality of pixels of the color-corrected image into one of a plurality of categories, and selecting the transform parameter $\alpha_v$ or the transform parameter $\alpha_r$ for each classified pixel of the color-corrected color image based on the plurality of categories.

2. The method of claim 1, wherein generating the color-corrected color image includes using values in the color calibration pattern in a series of linear equations that are solved to form transform parameters to color-correct the color image.

3. The method of claim 2, wherein determining the illumination invariant image based on transform parameters $\alpha_v$ and $\alpha_r$ is performed depending upon a segmentation classification.

4. The method of claim 3, wherein the series of linear equations are solved to obtain red-green-blue values for the color image that are the same as red-green-blue values of a color image acquired when the sun is at its highest point.

5. The method of claim 1, wherein the color calibration pattern includes a plurality of colors at a plurality of intensities.

6. The method of claim 5, further comprising using a near infrared (NIR) video camera that images near infrared frequencies of light in addition to a color video camera to increase a range of colors available for calibration.

7. The method of claim 6, wherein the range of colors include red, green and blue.

8. The method of claim 1, further comprising determining whether to transform an RGB pixel of the color image with transform parameter $\alpha_v$ or transform parameter $\alpha_r$ depending upon whether the RGB pixel is classified as "vegetation" or "non-vegetation".

9. The method of claim 8, wherein the RGB pixel is classified as "vegetation" or "non-vegetation" based on segmenting the color image by a trained convolutional neural network.

10. A system, comprising:
a processor; and
a memory, the memory including instructions to be executed by the processor to:
acquire a color image having a portion that includes a color calibration pattern;
generate, based on the color calibration pattern, a color-corrected color image that includes a plurality of pixels;
determine an illumination invariant image based on the color-corrected color image and transform parameters $\alpha_v$ and $\alpha_r$; and
actuate navigation of the vehicle based on the illumination invariant image, wherein determining the illumination invariant image includes classifying pixels of the plurality of pixels of the color-corrected image into one of a plurality of categories, and selecting the transform parameter $\alpha_v$ or the transform parameter $\alpha_r$ for each classified pixel of the color-corrected color image based on the plurality of categories.

11. The system of claim 10, wherein generating the color-corrected color image includes using values in the color calibration pattern in a series of linear equations that are solved to form transform parameters to color-correct the color image.

12. The system of claim 11, wherein determining an illumination invariant image based on transform parameters $\alpha_v$ and $\alpha_r$ is performed depending upon a segmentation classification.

13. The system of claim 12, wherein the series of linear equations are solved to obtain red-green-blue values for the color image that are the same as red-green-blue values of a color image acquired when the sun is at its highest point.

14. The system of claim 10, wherein the color calibration pattern includes a plurality of colors at a plurality of intensities.

15. The system of claim 14, wherein the plurality of colors are obtained using a near infrared (NIR) video camera that images near infrared frequencies of light in addition to a color video camera to increase a range of colors available for calibration.

16. The system of claim 10, further programmed to determine whether to transform an RGB pixel of the color image with transform parameter $\alpha_v$ or transform parameter $\alpha_r$ depending upon whether the RGB pixel is classified as "vegetation" or "non-vegetation".

17. The system of claim 16, wherein the RGB pixel is classified as "vegetation" or "non-vegetation" based on segmenting the color image by a trained convolutional neural network.

18. A system, comprising:
a sensor operative to acquire a color image;
a processor; and
a memory, the memory including instructions to be executed by the processor to:
acquire a color image having a portion that includes a color calibration pattern;
generate, based on the color calibration pattern, a color-corrected color image that includes a plurality of pixels;
determine an illumination invariant image based on the color-corrected color image and transform parameters $\alpha_v$ and $\alpha_r$; and
actuate navigation of the vehicle based on the illumination invariant image, wherein determining the illumination invariant image includes classifying pixels of the plurality of pixels of the color-corrected image into one of a plurality of categories, and selecting the transform parameter $\alpha_v$ or the transform parameter $\alpha_r$ for each classified pixel of the color-corrected color image based on the plurality of categories; and
a controller to control motion of the vehicle according to the navigation by actuating vehicle components based on commands received from the processor.

19. The system of claim 18, wherein the sensor is a color video camera.

20. The system of claim 18, wherein the vehicle components include braking, steering and powertrain.

* * * * *